United States Patent [19]

Gooch

[11] Patent Number: 5,585,977
[45] Date of Patent: Dec. 17, 1996

[54] RECORDING/REPRODUCING APPARATUS AND METHOD EMBODYING A UNIQUE SCANNING MAGNETIC TRANSDUCER

[75] Inventor: Beverley R. Gooch, Sunnyvale, Calif.

[73] Assignee: Ampex Corporation, Redwood City, Calif.

[21] Appl. No.: 511,983

[22] Filed: Aug. 7, 1995

[51] Int. Cl.$^6$ .............................. G11B 5/53; G11B 5/008
[52] U.S. Cl. ........................... 360/84; 360/110; 360/115; 360/130.22
[58] Field of Search ................................. 360/84, 85, 95, 360/107, 110, 115, 130.2–130.24, 137

[56] References Cited

U.S. PATENT DOCUMENTS

| | | | |
|---|---|---|---|
| 4,040,110 | 8/1977 | Bagby | 360/130.22 |
| 4,151,591 | 4/1979 | Sziklai | 360/115 |
| 4,636,886 | 1/1987 | Schwarz | 360/84 |
| 4,647,993 | 3/1987 | Schwarz et al. | 360/84 |
| 4,782,277 | 11/1988 | Morita | 318/696 |
| 4,796,134 | 1/1989 | Watanabe et al. | 360/110 |
| 4,985,795 | 1/1991 | Gooch | 360/115 |
| 5,060,104 | 10/1991 | Kitaori et al. | 360/130.22 |
| 5,070,487 | 12/1991 | Watson | 360/84 |

FOREIGN PATENT DOCUMENTS

| | | | |
|---|---|---|---|
| 2382070 | 10/1978 | France | 360/84 |
| 3239306 | 7/1984 | Germany | 360/84 |
| 56-90457 | 7/1981 | Japan | 360/130.22 |
| 56-158582 | 12/1981 | Japan | 360/84 |
| 58-14314 | 1/1983 | Japan | 360/130.22 |

*Primary Examiner*—Jefferson Evans
*Attorney, Agent, or Firm*—John G. Mesaros; George B. Almeida

[57] ABSTRACT

In a recorder/reproducer apparatus, a scanning magnetic transducer for the magnetic recording and reproducing of a data signal in a magnetic storage medium. The transducer includes one or more elongate main pole segments embedded in the periphery of a rotary drum and oriented at an angle relative to the drum's axis of rotation. An elongate stationary pole with an electromagnetic winding coupled to the data signal is spaced from the drum and oriented generally parallel to the axis of rotation. A magnetic tape is transported between the two poles in contact with the main pole segments on the drum and spaced from the stationary pole. Rotation of the drum during recording and/or playback causes the area of intersection, that is, the opposed common area or confronting face portions, of the stationary pole and each of the successive main pole segments to be moved or scanned along the face of the stationary pole. A concentrated magnetic field corresponding to the data signal is generated at the area of intersection and thus also is moved along the length of the stationary pole. As a result, a series of generally transverse tracks of magnetic states are recorded in, or reproduced from, the tape as it is moved between the main pole segments and the stationary pole. Plural stationary poles may be used to provide a multiple track magnetic transducer for recording and reproducing multiple tracks in the magnetic storage medium.

22 Claims, 6 Drawing Sheets

RECORDING/REPRODUCING APPARATUS AND METHOD EMBODYING A UNIQUE SCANNING MAGNETIC TRANSDUCER

BACKGROUND OF THE INVENTION

The present invention is directed to recorder/reproducer apparatus and method embodying a unique magnetic signal transducer for storing information in a magnetic storage medium and retrieving the information stored therein. Further, the present invention is directed to a new type of scanning transducer which is capable of recording in and reproducing from magnetic media designed for vertical and/or horizontal recording.

During the recording of time varying information on a storage medium, the medium and the transducer are moved relative to one another. This relative motion is effected in various ways leading to a number of different recording formats. In one format, a storage medium such as a magnetic tape is transported past the transducer in the longitudinal direction of the tape. In this format, the information is recorded in the tape in a track which is coextensive with the length of the tape.

In an effort to increase the frequencies of information recorded in the tape, it has been known to move the transducer mechanically at an increased speed relative to the tape, to thereby scan the position of the transducer across the width of the tape. In such apparatus, the transducer is moved across the tape in a direction at a slight angle relative to the longitudinal direction in which the tape is transported. For example, in typical transducing arrangements the transducer is mounted on a drum that rotates about an axis generally parallel to the direction of tape transport. As a result of this movement, the transducer defines a track which is substantially perpendicular to the longitudinal dimension of the tape. Repeated scanning of the transducer in this manner, coupled with the transport of the tape in its longitudinal direction, produces discrete parallel tracks that extend across the width of the tape and are successively spaced along the length of the tape. In devices recording information in this mechanically scanning fashion, the width of the transducer and of the respective gap which produces a magnetic field to effect the recording of information, is much less than the width of the tape, whereby the unit pressure of each individual head on the tape is relatively high and promotes undesirable wear on the head and storage medium.

In another type of mechanically scanning arrangement used for example, in data and video recording, the parallel tracks are oriented at a very shallow angle, e.g. 5° to 15°, relative to the longitudinal edge of the tape. This track orientation is provided by wrapping the tape around a drum shaped tape guide in a helical manner. The transducer is mounted on the circumferential surface of the drum for rotation. The longitudinal movement of the tape along its helical path, coupled with high speed rotation of the transducer during recording, results in parallel tracks being formed in the tape at the shallow angle.

While the scanning of a transducer across the tape significantly increases the frequencies of the information which may be stored in a tape, it is not without its attendant limitations. In particular, prior mechanically scanning arrangements have generally required that the portion of the transducer containing electrical windings, which generate and/or intercept the information flux, be moveable. For example, in the arrangements described previously, the entire transducer is mounted on a rotating drum. As a result, rather complex and costly electrical connections are required to facilitate the movement of and electrical connection to the transducer and its associated windings.

In addition, since the transducer is moveable, it is necessary to locate the record and reproduce electronics some distance away from the transducer. Consequently, relatively long leads are required to connect the signal processing electronics to the signal winding of the transducer. The need to use long leads, coupled with the rather complex connectors for connecting these leads to the moveable winding, results in high frequency losses and hence signal degradation.

Another concern associated with mechanically scanned transducers is their limited life, which decreases their reliability in certain applications. As previously mentioned, in magnetic tape recorders the transducer is in physical contact with the tape and is subject to high unit pressure. Because of the contact and the high speed of relative movement between the transducer and the tape in a scanning type of operation, the transducer is subject to significant wear. As a result, a typical mechanically scanned head might have a useful operating life of 1000–2000 hours, after which it must be replaced. The need to change the head after this period of operation reduces its reliability for some applications. For example, in high speed data backup operations, it is desirable to have a backup recorder running continuously in an out-of-the-way location with the knowledge that it is reliably capturing all information sent to it. However, if the transducer must be replaced on a frequent basis its reliability in such an environment is reduced. In addition, the cost of operating the recorder in such a situation is significant because of the need for continual replacement of parts.

A further version of a mechanically scanned head, of a probe type, employs a rotary head assembly which includes a generally flat, circular disk with a plurality of individual main poles embedded in the periphery of the rotary disk. The main poles may be embedded within the circumference of the disk to extend approximately radially relative to the rotary disk's axis of rotation, or may be embedded within the outer rim of the disk with the main poles extending generally parallel to the disk's axis. In the first embodiment, the poles scan a straight track generally transverse to the length of a magnetic tape (the tape must be concave to match the circumference of the disk), while in the second embodiment the main poles describe successive arcuate tracks across the tape width. A second stationary pole provides support for the magnetic tape while urging the tape against the main poles in the rotary disk. The stationary pole includes a signal coil wrapped thereabout via which a data signal is applied to the head assembly for recording. Rotation of the disk causes the main poles to sweep successively across the tape and the stationary pole so that they function as the main pole of a typical probe head.

This version also experiences excessive head and tape wear since the tape is confined with pressure between the stationary and main poles whereby the individual heads contact the tape with the relatively high unit pressure of previous mention.

In an effort to eliminate the need for moving transducer elements, magnetically scanned transducers, also known as solid-state scanning transducers, have been developed. In these types of devices, the transducer remains stationary and the magnetic signal to be recorded onto or reproduced from the tape is scanned across the face of the transducer. For example, in many of these transducers, a portion of the core is magnetically saturated to prevent signal flux from flowing therein. As a result, the signal flux can flow in only a limited region of the core which is unsaturated. By varying the location of the saturated region, either electronically or magnetically, the signal flux is scanned across the transducer, and hence across a tape disposed adjacent to it.

While such magnetically scanned transducers have eliminated the need for physically moving individual transducers to achieve scanning, they have not yet achieved widespread use due to various practical considerations in their implementation. Accordingly, there is still a need for the reliable, low cost scanning transducers such as those of previous mention which employ mechanical movement of the individual lo transducer elements across the magnetic storage medium.

It is to be understood that the term "mechanically scanned" transducers as used herein is intended to identify the typical prior art transverse and helical scan recording/reproducing apparatus in common use at the present time. This is to distinguish such typical apparatus from the present invention which, although it uses a mechanically rotating drum to aid in the scanning technique, does not mechanically move an individual transducing head (or heads) to perform the actual scanning of a respective magnetic track in the tape. For example, in the invention, the dimension of a recorded track in the tape generally is determined by the stationary pole, not the moveable main pole. Ergo, the scanning action is, in essence, a function of an intersecting portion of the "non-mechanically scanning" stationary pole, as contrasted with the typical "mechanically scanning" prior art of previous discussion. Thus, the term "mechanically scanning" is used herein to facilitate the comparison between the "mechanically scanned" prior art and the "non-mechanically scanned" present invention.

SUMMARY OF THE INVENTION

The present invention addresses these limitations associated with the mechanically and magnetically scanned transducers of previous discussion. The need for the head-to-tape contact and the complex and inefficient connections to the transducer are eliminated by means of an arrangement which employs opposed magnetic poles that record and reproduce information without the complex mechanically scanned techniques, or the unavailable practical implementations of the magnetically scanned apparatus, of previous discussion. To this end, a series of main pole segments are mounted on a moveable member and oriented at an angle relative to the direction of movement of the member. Preferably, the moveable member is a rotary drum that also serves as a tape guide for directing the tape along a defined path relative to the record and/or reproduce elements, and the main pole segments are mounted within the periphery of the drum at an angle relative to its axis of rotation. As the drum rotates, successive main pole segments trace successive locations or tracks in a magnetic storage medium, such as a magnetic tape. To enable this function, an elongated stationary pole is located on the opposite side of the medium from the rotatable main pole segments with its longitudinal dimension generally transverse to the medium's direction of movement whereby the main pole segments are oriented at a selected angle relative to the stationary pole. In the preferred embodiment which employs the rotary drum as the moveable member, the stationary pole is oriented generally parallel to the axis of rotation of the drum.

In operation, the stationary pole and the main pole segment that is opposed to it at the selected angle, form the operative poles for generating or detecting a magnetic field in accordance with the present invention. The magnetic storage medium is transported between these poles. At the point where a moveable main pole segment and the stationary pole intersect, a data signal in the form of magnetic states is recorded in, or reproduced from, the medium. To facilitate the description of the invention, the term "intersection" is used hereinafter in describing the physical relationship of a main pole segment relative to the opposing spaced-apart stationary pole as the segment is rotated past the stationary pole with the magnetic storage medium therebetween. Since the segments and stationary pole are oriented at an angle, movement of a segment past the pole causes movement of the common area or portion shared thereby at their intersection, thus causing the shared common area, or point of "intersection" or "crossing", to move or scan along the longitudinal dimension of the stationary pole. This movement of the shared common area or point of intersection, provides the scanning motion of the corresponding magnetic state generated in the common area which, in turn, results in the recording of successive magnetic tracks across the adjacent storage medium. Thus, as the main pole segments are moved relative to the stationary pole, for example by rotation of the drum, their respective points of intersection with the stationary pole, and thus the opposing shared common areas of concentrated magnetic field, move successively along the stationary pole and therefore trace successive tracks across the width of the recording medium moving therebetween. Consequently, a series of generally transverse tracks are recorded in, or reproduced from, the tape.

It readily is apparent that the present invention radically decreases the complexity of typical prior art mechanically scanned magnetic transducing heads and the associated tape transports, tape paths, rotary scanners, etc., since the need for multiple heads rotating within a rotary drum about which the magnetic tape is helically wrapped, is eliminated. In addition, the present arrangement does not require any electrical connections to the moveable main pole segments. The only pole which contains a signal winding is stationary, and therefore the electrical connections thereto are extremely simple and inexpensive. Moreover, the record and reproduce electronics are placed in very close proximity to the stationary pole, thereby reducing the high frequency losses that are encountered with long leads in the more complex electrical connections of the mechanically scanned prior art.

It may be seen that all of the signal information is either taken from or applied to the winding of a stationary pole, which facilitates the design of a multiple transducing head assembly capable of recording and reproducing data in multiple tracks spaced across the width of the tape. Furthermore, the embedding of the major portion of the pole segments within the circumference of a drum, coupled with minimal contact between the segments and the tape, significantly increases the depth of the head while reducing wear, thereby increasing the operating life and reliability of the present magnetic transducer, the magnetic storage medium and the associated tape transporting mechanism.

The foregoing features of the invention, and the advantages produced thereby, are described in greater detail hereinafter with reference to preferred embodiments of the invention illustrated in the accompanying drawings.

BRIEF DESCRIPTION OF THE DRAWINGS

FIG. 4B is a partial cross-section of a main pole segment taken along section line 4B—4B of FIG. 4A with the segment embedded in a rotary drum;

DESCRIPTION OF THE ILLUSTRATED EMBODIMENTS

Figure 1:
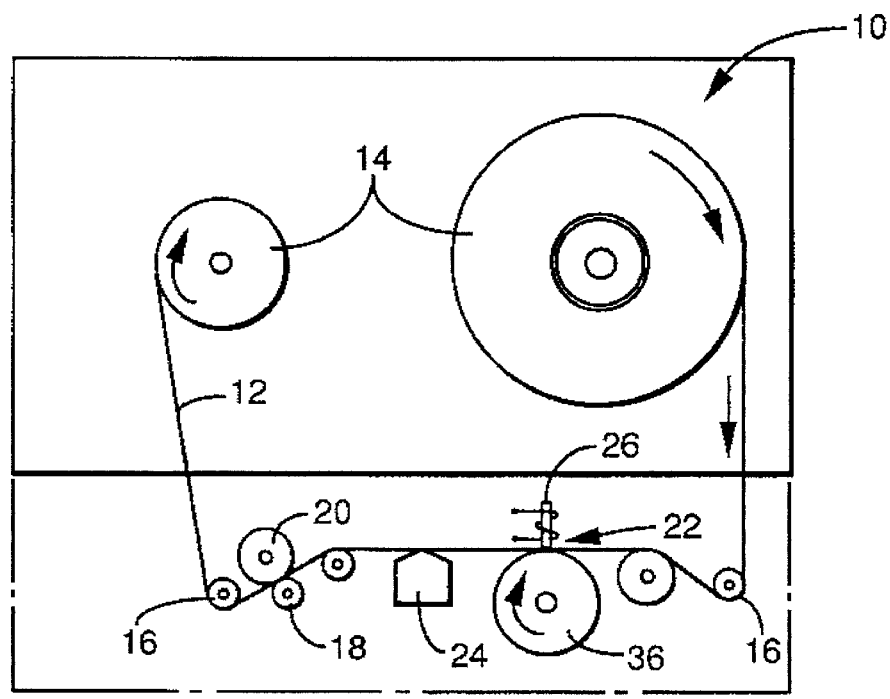
FIG. 1 is a schematic plan view of a magnetic recording and/or reproducing apparatus which implements the principles of the present invention.

In magnetic recording, the information stored in a magnetic storage medium, such as a magnetic tape, is represented by magnetic states defined by the orientation of magnetic particles in a layer of the medium. These magnetic states are characterized as having a horizontal component and a vertical component. Generally speaking, the horizontal component is defined as that component of the magnetic state which is parallel to the plane of the medium, e.g. the surface of the tape. The vertical component is perpendicular to this plane or surface. Various types of recording apparatus, as well as recording media, are classified according to whether they emphasize the horizontal or vertical component of the magnetic states stored in the medium.

One example of a magnetic transducer which utilizes horizontal recording is the well known ring head. In this type of structure, a ring-shaped core has a non-magnetic gap, forming two magnetic poles. When flux is generated in the core during a recording operation, the gap causes a fringing field to be produced between the poles. The magnetic medium is disposed adjacent the gap and tangential to the fringing field. As a result, magnetic states defined in the medium by the fringing field are oriented parallel to the surface of the medium. During subsequent playback operations, fringing magnetic fields are generated by these magnetic states stored in the medium. These fields are successively coupled into the core and detected therein, as the portions of the tape associated with the states are transported past the gap.

In contrast, in vertical recording devices, the portion of the magnetic field which defines or alters the magnetic states in the media is oriented perpendicular to the surface of the media. This effect is produced, for example, by passing the tape between two poles that generate the field. Consequently, the stored magnetic states primarily are comprised of a vertical component, and have a horizontal component to which the poles have less sensitivity.

The present invention as described herein generally functions in accordance with this latter type of operation, i.e. vertical recording and reproducing. However, a scanning transducer constructed in accordance with the present invention is not limited to recording in, or reproducing from, magnetic media which is specifically designed for vertical recording. Although this type of media is preferred, a magnetic transducer incorporating the principles of the present invention also operates in conjunction with magnetic media designed for horizontal recording. However, the result is a less efficient recording since the data signal which is recorded in the media is represented by a partial rotation of the magnetic states in the media, whereby the stored magnetic states are composed of a compromise between vertical and horizontal components resulting accordingly in a less efficient recording.

Vertical recording techniques provide certain advantages over horizontal recording techniques in some applications. Foremost among these are their ability to record and reproduce signals of short wavelengths of, for example, less than 50 microinches. More particularly, as the frequency of the recorded information increases, and its wavelength correspondingly decreases, the recording density increases. An increase in recording density is accompanied by a corresponding disadvantageous increase in demagnetization for horizontal recorded components. However, as is well known, vertical magnetic media exhibits lower demagnetization losses and thus demagnetization losses are decreased for vertically recorded components. Therefore, at extremely high recording densities, e.g. high frequency data recording, vertical recording provides various advantages.

A vertical magnetic recording and/or reproducing mechanism of a type which employs the principles of the present invention is schematically illustrated in FIG. 1 by way of example only. This particular type of recording and reproducing mechanism is designed to operate in conjunction with a magnetic tape cassette 10. The cassette 10 contains a magnetic storage medium, herein referred to as a tape 12, wound about first and second reels 14. When the cassette is placed in an appropriate loading mechanism (not shown), the tape is disposed about a pair of guide rollers 16 which facilitate its transport relative to magnetic heads. The speed of movement of the tape is controlled by a capstan 18 and, by way of example herein, a pinch roller 20 forces the tape into frictional engagement with the capstan. Other capstan arrangements may be used. A first magnetic transducing head 22, for recording and/or reproducing information disposed in transverse tracks in the tape in accordance with the principles of the present invention, is situated adjacent the path of transport of the tape. If the tape contains one or more longitudinally oriented tracks, a second head 24 also may be located adjacent the transport path of the tape. For example, if the apparatus is used to record and/or reproduce video signals, the video information generally are contained in the transverse tracks which are associated with the head 22. Control data and audio information can be recorded in the longitudinal tracks associated with the second head 24. The first head 22, as exemplified herein, utilizes vertical recording techniques and is constructed in accordance with the principles of the present invention. Since control and audio information need not be recorded on the tape as densely as the video information, the second head 24 can be a conventional ring type head which records and reproduces by means of horizontal recording techniques. Although the recording made by the ring head in the vertical medium is not as efficient as if it had been made by a vertical recording head, it is adequate for the purpose intended.

Figure 2:
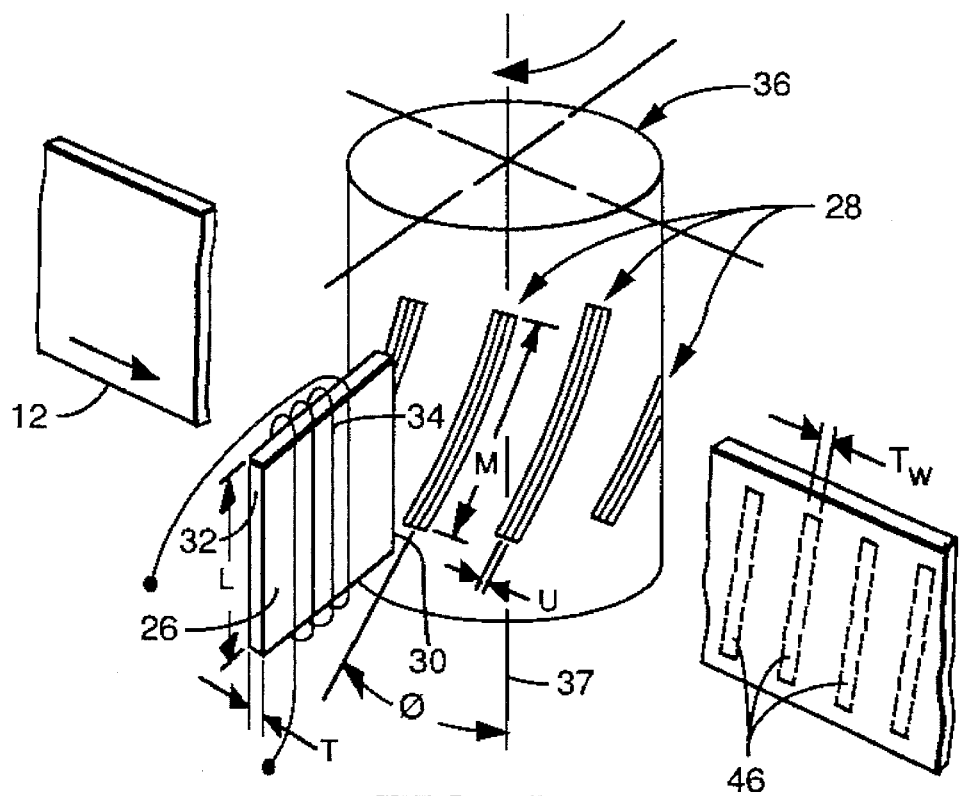
FIG. 2 is a perspective view of a magnetic transducing head constructed in accordance with the present invention.

An embodiment of the present transducing head 22 is illustrated in greater detail in the perspective view of FIG. 2. Referring thereto, the head comprises a stationary pole 26 and a plurality of main pole segments 28. The stationary pole 26 is of elongate shape in the dimension corresponding to the width of the tape, with its longitudinal dimension L being vertically oriented in the embodiment shown in FIG. 2 to facilitate this description. The length L is less than the width of the tape and generally determines the track length. Thus, for a tape of one-half inch width, the length L may be of the order of from 0.3 to 0.48 inches. The thickness T of the stationary pole 26 determines the width of the track and is of the order of from 0.001 to 0.004 inches. The pole 26 is formed of a magnetic material such as ferrite and has a pair of opposite end faces 30 and 32. A signal winding 34 is wound around the pole intermediate the end faces and provides the electrical connection for applying and/or retrieving an analog or digital data signal which is to be recorded in and reproduced from the storage medium.

The main pole segments 28 are embedded within the circumferential surface of a non-magnetic material rotary drum 36, parallel to one another. The drum is mounted with its axis of rotation 37 generally parallel to the longitudinal dimension L of the stationary pole 26, i.e. vertically in this example. The main pole segments 28 are elongated, and disposed within the surface of the drum 36 so that their longitudinal dimension M is oriented at an acute angle φ relative to the axis of rotation of the drum 36, and hence relative to the longitudinal dimension L of the stationary pole 26. In this example, U is of the order of 0.000010 to 0.000040 inch, and M is of the order of 0.640 inch.

Figure 3:
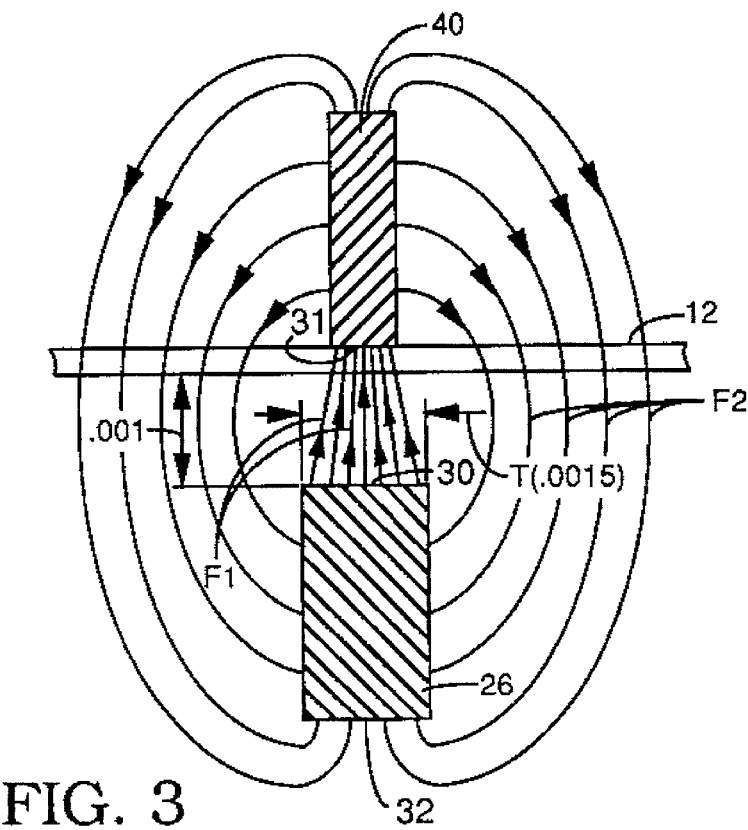
FIG. 3 is an enlarged top plan view depicting the intersecting point of a stationary pole, a main pole and a magnetic storage medium, illustrating the magnetic field which is generated during a recording operation.

Referring to FIGS. 1 and 2, during a recording or reproducing operation, the tape 12 is disposed between the stationary pole 26 and the rotary drum 36. The tape is in contact with the drum and thus with each successive main pole segment 28, and is oriented so that its magnetic coating is on the side of the tape facing the drum. The elongated end face 30 of the stationary pole 26 is spaced from the peripheral surface of the drum by an amount such that the stationary pole is out of contact with both the tape and the drum. Preferably, to enhance the sensitivity of the head the end face 30 of the stationary pole 26 is spaced about 1 mil (approx. 0.025 mm) from the back side of the tape 12 (FIG. 3).

Figure 4A:
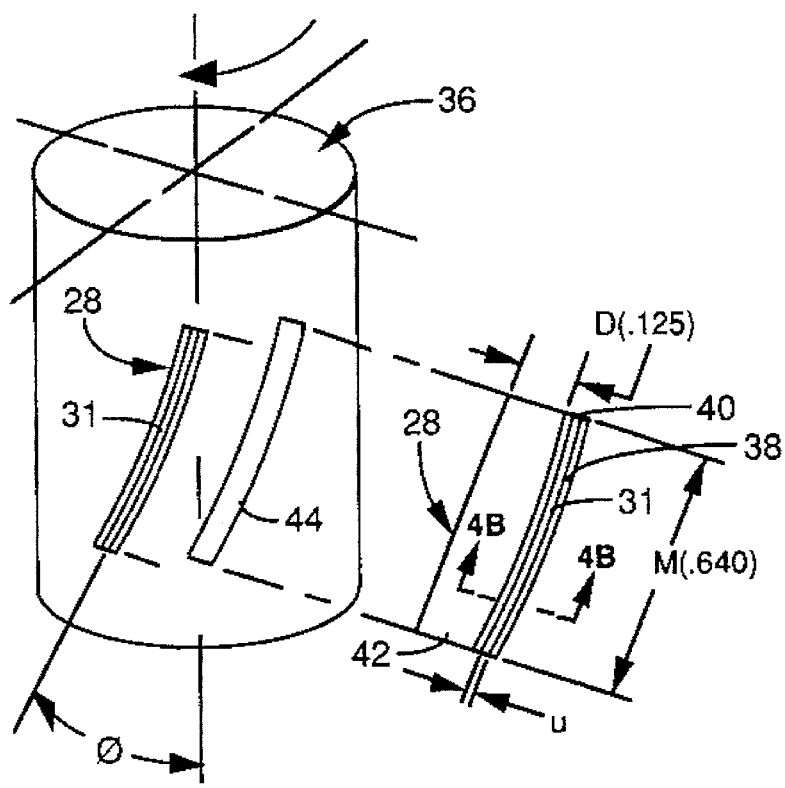
FIGS. 4A, 4B are more detailed views of the main pole segments of the magnetic transducing head in the rotary drum.
Figure 4B:
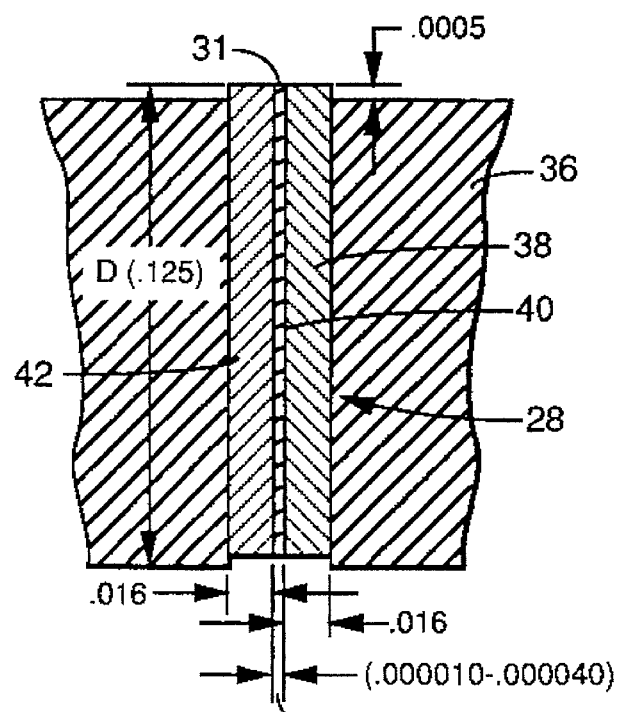

The structure of a main pole segment 28 is illustrated in greater detail in FIGS. 4A, 4B, wherein various dimensions are shown by way of example only. Note that the widths of the main pole segments 28 purposely are exaggerated for ease and clarity of description in the figures. To efficiently record and reproduce short wavelength signals, a high permeability magnetic element which forms the main magnetic pole of the segment 28, should have an extremely small thickness U, preferably of the order of the 10–40 microinches of previous mention. To facilitate the construction of such a thin main pole element in each main pole segment 28 to be embedded in the drum 36, each main pole segment 28 preferably is manufactured as a laminated structure. Referring to FIGS. 4A, 4B, each segment comprises a non-magnetic substrate 38, a magnetic layer 40 and a non-magnetic cover layer 42. The magnetic layer 40 is composed of a high permeability magnetic material having a high saturation moment, $B_S$, so that it does not saturate prior to saturation of the tape 12. In other words, the field required to saturate the material of the main pole segment should be of greater magnitude than that required to saturate the magnetically coercive layer in the storage medium. In addition, the material of the magnetic layer 40 should exhibit a high degree of hardness, to reduce wear and to enable it to keep its shape during machining of the drum structure. One material which exhibits these desired characteristics and has been found to be particularly suitable for use in the practice of the present invention is cobalt zirconium niobium alloy. In addition, the materials commonly known as Alfesil and Permalloy may be used.

Each of the non-magnetic layers 38 and 42 preferably is constructed of a hard material, such as a ceramic, with a thickness of the order of 0.016 inches, for example, which layers function to protect the thin magnetic layer 40 and also to provide a low wearing surface. In the construction of the main pole segments, the magnetic material layer 40 can be sputtered on the non-magnetic substrate 38 to the desired thickness U, and the non-magnetic cover 42 is deposited on the magnetic layer. If desired, one or more non-magnetic materials, such as chrome, can be sputtered or otherwise deposited on the magnetic layer 40 to improve the bonding of the cover layer 42 to the structure. This laminated segment then is inserted in a recess 44 suitably formed in the surface of the rotary drum 36. The main pole segments 28 may be fully embedded within the rotary drum 36 with an end face 31 of the layer 40 flush with the drum surface, or may be mostly embedded with the end face 31 protruding a slight distance above the surface, for example, 0.1 to 0.5 mil (FIG. 4B).

In operation, the tape is transported along a horizontal path (as viewed in FIG. 2), i.e. perpendicular to the longitudinal dimension L of the stationary pole 26 and the axis of rotation of the drum 36. The drum is rotated by a motor 45 (FIG. 5) in the clockwise direction as viewed from above in FIGS. 1 and 2 so that, at the point of contact, the drum and tape are moving in opposite directions. The tape may be moved in the same direction as the drum if desired since the speed of the drum is orders of magnitude greater than the tape speed. During a recording operation, a current corresponding to the varying digital or analog data signal being recorded, is applied to the signal winding 34. This current causes a magnetic field to be generated by the stationary pole 26. This field is illustrated in FIG. 3. As seen therein, lines of flux F1 generated by the stationary pole 26 extend from a portion of the end face 30 of the pole, perpendicularly through the tape 12, to enter the shared common portion of the end face 31 of the opposing main pole layer 40. Returning lines of flux F2 emanate from the sides and rear end face of the main pole magnetic layer 40 and return to the sides and rear end face 32 of the stationary pole 26. The magnetic layer 40 is very thin and is made of the high permeability magnetic material of previous mention, and therefore functions to concentrate the flux extending from the stationary pole 26. The resulting concentrated magnetic field magnetizes the circumferentially exposed tip, that is, the end face 31 of each high permeability main pole layer 40 when each is rotated in facing opposition to the end face 30 of the stationary pole. Magnetic states are recorded in the tape as a result of the concentrated, sharply defined magnetic field produced at the end face 31 of the magnetic layer 40 as each is moved past the end face 30 of the stationary pole 26 along the longitudinal dimension L. In particular, the concentrated magnetic field is generated at the opposing, shared common area or portions of the segment and stationary pole, which common area and associated concentrated magnetic field move transversely relative to the width of the tape as the rotary drum 36 is rotated, to record the varying magnetic states of the applied data signal in the tape.

During a reproducing operation, the end face 31 of the high permeability main pole magnetic layers 40 become magnetized by the surface flux of the magnetic states recorded in the tape as the tape is transported between the rotating main pole segments and the stationary pole. The stationary pole 26 detects the field produced by the opposed common area or portion of the magnetized main pole segment, that is, the magnetic layer 40. This field cuts across and excites the signal windings 34 to produce an output voltage indicative of the analog or digital data signal recorded in the tape 12.

Thus, information is recorded in or reproduced from the tape at a point where a main pole segment 28 and the stationary pole 26 intersect, that is, at a point where the opposing facing poles share a common opposing area. Since the drum is rotating during operation, the point of intersection between the stationary pole 26 and each main pole segment 28 is moved, or scanned, along the length L of the stationary pole. As a result, a series of generally transverse tracks 46 (FIG. 2) extending across the width of the tape 12 are recorded in, or reproduced from, the tape. The length of the tracks in general is determined by the longitudinal dimension L of the stationary pole 26.

During the operation of the magnetic transducer 22, the peripheral end face 31 of each of the magnetic layers 40 which is exposed at the surface of the drum 36 should be in contact with the tape, particularly for efficient operation during the recording or playback of short wavelength signals. Due to the rotation of the drum 36, however, an air film may be present between the surface of the drum and the tape, which inhibits this desirable contact between the tape and the magnetic layers 40 of the main pole segments 28. To ensure a greater possibility of contact, and thereby increase the efficiency of operation, it may be preferable to arrange the main pole segments 28 within the drum so that they protrude slightly from the peripheral surface of the drum 36 on the order of from 0.1 to about 0.5 mil, rather than being flush with it. In this manner, the pole segments will project into the air film. Alternatively the drum can be provided with suitable grooves (not shown) along its peripheral surface to form air spaces which reduce or eliminate the air film between the tape and the drum.

The width of the tracks Tw on the tape 12 (FIG. 2) is determined by the thickness T of the stationary pole 26 (FIGS. 2, 3) and is of the order of from 0.001 to 0.004 inch. The thickness U of the magnetic layer 40 of the main pole segments 28, on the other hand, determines the shortest wavelength signal that can be reproduced from the tracks on the tape and is of the order of from 10 to 40 microinches. The particular acute angle $\phi$ between the orientation of the longitudinal dimension L of the stationary pole 26 and the length M of the main pole segments 28 can vary over a wide range, depending on the operating characteristics that are desired for the magnetic transducing head. On one hand, a very small angle between the two poles, e.g. 5°–10°, provides a velocity enhancement in terms of the speed of the track scan across the tape relative to the rotational speed of the drum. More particularly, as the angle between the opposing poles is decreased, the drum can be rotated slower or faster to provide a given speed of scanning along the length L of the stationary pole. A slower rotational speed may be desirable, for example, to slow the scanning speed if the angle is decreased, and to reduce the air film between the drum and the tape, as well as to reduce even further the wear on the moving parts and the tape. On the other hand, a greater angle provides a greater degree of control over the scanning rate. In particular, an angle $\phi$ of 45° is preferred because at that orientation, the scanning speed, that is, the speed of movement of the point of intersection, or the common opposing area of the two poles 26 and 28, across the width of the tape, is directly proportional to the angular velocity of the rotary drum. Thus, precise control over the scanning rate can be obtained through appropriate control of the rotational speed of the drum 36. Thus, it may be seen that the scanning rate is a function of the speed of rotation of the drum 36 and of the relative angle $\phi$ between the two poles.

Figure 5:
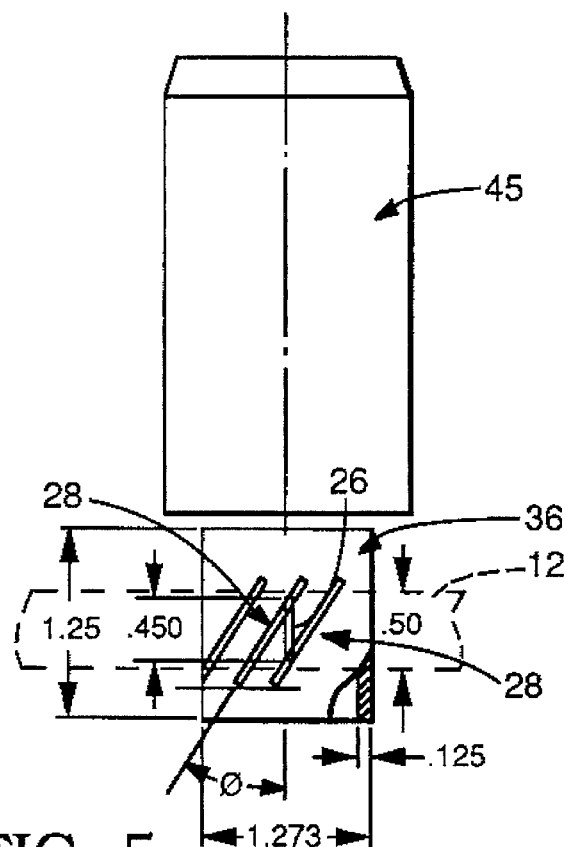
FIG. 5 is a side view of the magnetic transducing head combination relative to the magnetic storage medium.

Referring to FIG. 5, a side view of the present transducing head is illustrated. As shown therein, the main pole segments 28 are preferably spaced apart a distance such that there is a slight overlap of the opposite ends of adjacent main pole segments 28 at either end of the longitudinal dimension L of the stationary pole 26. During the major amount of time that the stationary pole is being scanned, only one of the main pole segments 28 intersects the end face 30 of the stationary pole 26 at any given time. By spacing the main pole segments within the drum 36 so that the lowermost end of one segment intersects the stationary pole simultaneously with the uppermost end of the adjacent segment, the same piece of information is simultaneously recorded at the beginning and end of two separate tracks of the tape, respectively. With this arrangement, continuous recording and reproducing of the information signal is obtained without interruption or loss of data between successive scans of the stationary pole 26. Thus, the spacing between the main pole segments 28 disposed about the drum 36 primarily is a function of the angle $\phi$ between the two magnetic poles. As may be seen, FIG. 5 further illustrates various dimensions of the rotary drum 36 by way of example only.

Since the moving portion of the transducing head, i.e. the rotary drum carrying the main pole segments 28, does not contain any signal windings, there is no need for complex rotary electrical connections. Rather, the only element requiring electrical connections is the stationary pole 26. As such, the electrical connections thereto are extremely simple. Furthermore, since the pole 26 is stationary, the record and reproduce electronics that are connected to the signal winding 34 are located in very close proximity to the head, thereby dispensing with the need for long electrical leads that can result in high frequency losses.

Figure 6:
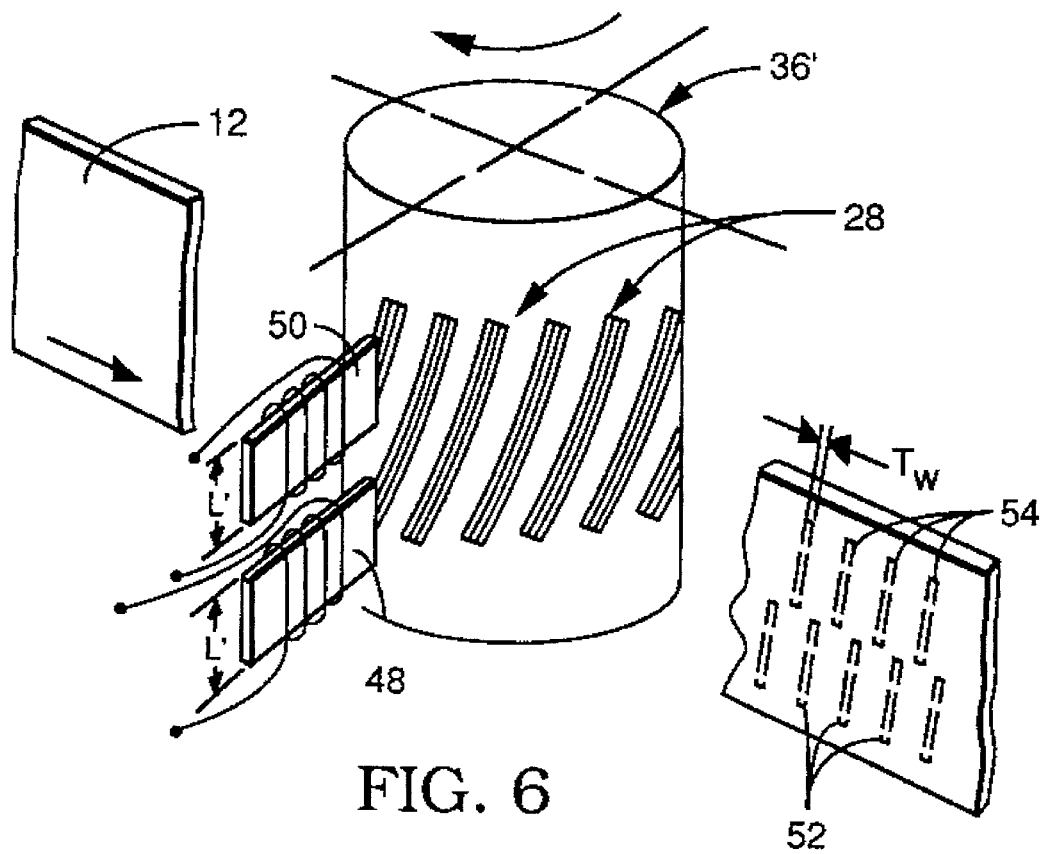
FIG. 6 is a perspective view of an embodiment of the invention which can be used to provide two signal channels along respective tracks spaced across the width of a magnetic storage medium.

Furthermore, the use of a stationary pole with the windings thereon facilitates the implementation of a multi-track scanning magnetic transducing head embodying the concepts of the present invention, for generating a corresponding multi-track format in the magnetic storage medium. To this end, one embodiment of a multi-track scanning head is illustrated in FIG. 6. Referring thereto, the multi-track transducing head apparatus has the same basic configuration as the single track embodiment illustrated in FIG. 2. It differs therefrom, however, by the fact that there are two stationary poles 48 and 50 spaced in the longitudinal dimension L, corresponding herein to the vertical direction. This arrangement results in a pair of channels 52 and 54 for each track. These channels are spaced from one another along the length of the tracks, and also are spaced slightly in the width dimension of the tape. Thus, the tracks of one channel alternate in position in the direction of the length of the storage medium, with the spacing between alternate tracks determined by the angle $\phi$ of the main pole segments. In the embodiment of the invention illustrated in FIG. 6, each of the stationary poles 48 and 50 has a longitudinal dimension L' which is approximately one-half the longitudinal dimension L of the single stationary pole 26 of the FIG. 2 embodiment. As a result, in order to produce continuous recording on each of the tracks, the number of main pole segments 28 embedded about the circumference of a rotary drum 36' in the FIG. 6 embodiment is increased by a factor of two over the single track embodiment. With this embodiment, therefore, two different signals simultaneously may be recorded on the tape.

Figure 7:
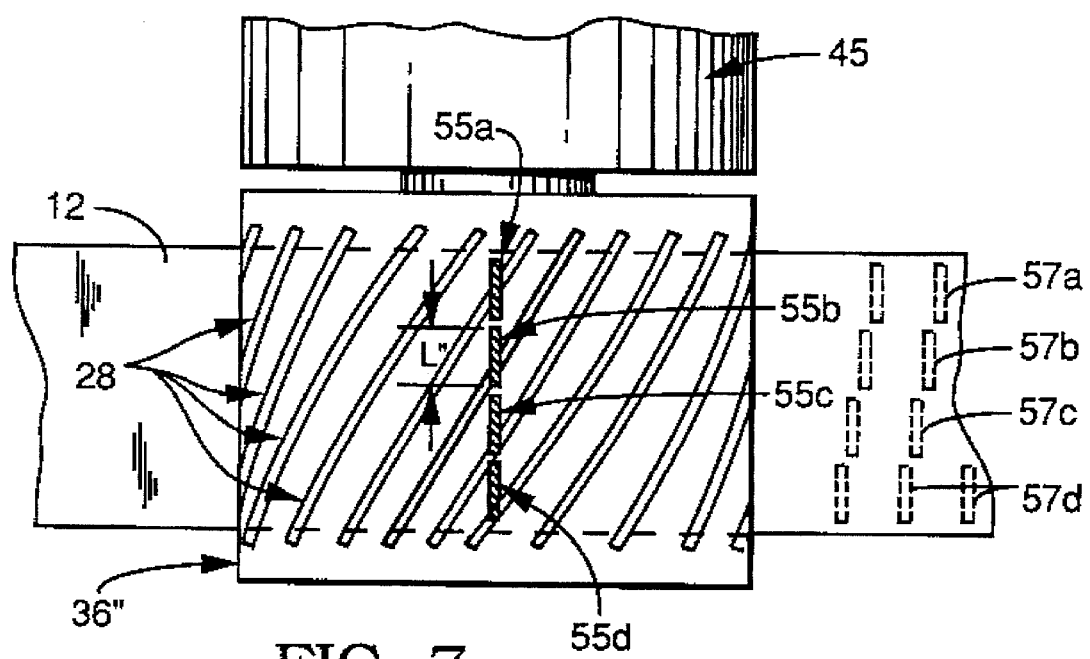
FIG. 7 is a side view of a further embodiment of the invention that can be used to provide multiple signal channels spaced across the width of a magnetic storage medium.

This alternative arrangement of the transducing head can be modified to simultaneously record or reproduce as many signals as desired. A practical limit is determined by the number of main pole segments 28 which can be embedded in the drum. By way of example, FIG. 7 illustrates a further embodiment of the invention in which four signals can be simultaneously recorded or reproduced. In this embodiment, four stationary poles 55a–55d are spaced in the vertical direction, and the number of main pole segments 28 within the circumference of a rotary drum 36" is increased by a factor of four, relative to the single track embodiment. The length L" in the longitudinal dimension of the multiple stationary poles 55a–55d, and thus the length of the individual tracks 57a–57d recorded in the storage medium, are approximately one-fourth the length L of the single track of the FIG. 2 embodiment. As in FIG. 6, the tracks of each channel are staggered in the direction corresponding to the length of the medium in accordance with the spacings between the stationary poles 55a–55d, the angle selected for the main pole segments 28 and the speed of drum rotation.

Figure 8A:
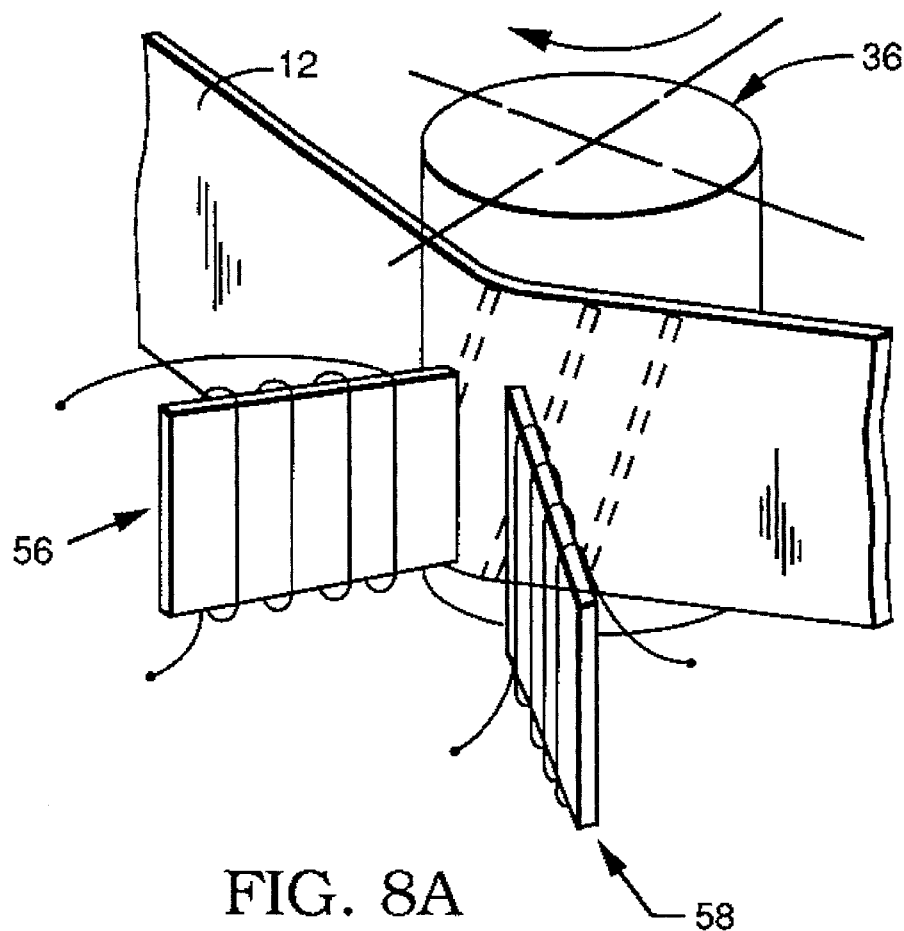
FIGS. 8A and 8B are a perspective view and a top view, respectively, of another embodiment of the invention containing separate record and reproduce magnetic transducing heads.
Figure 8B:
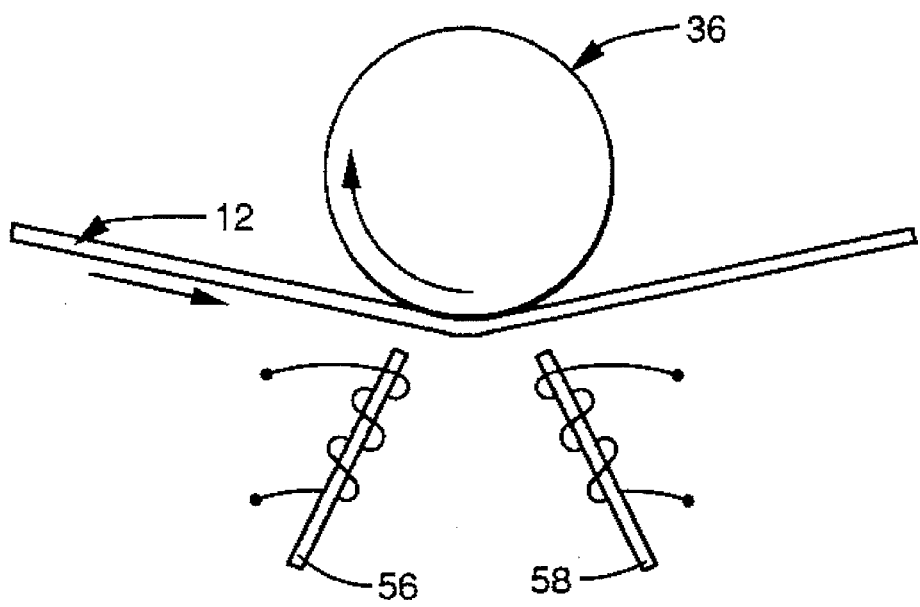

A further embodiment of the invention is illustrated in FIGS. 8A and 8B. This embodiment contains two separate stationary poles 56 and 58 that are spaced from one another in the direction of tape movement. One of these poles, for example the stationary pole 56, is used for recording, and the other pole 58 is used for playback. With this arrangement, a generally conventional read after write, or confidence playback, processing of the recorded signal, is obtained. Although FIGS. 8A and 8B illustrate this embodiment as a single track version, a multi-track version embodying the configurations of, for example, FIGS. 6, 7 may be similarly constructed in accordance with the present invention principles.

Figure 9:
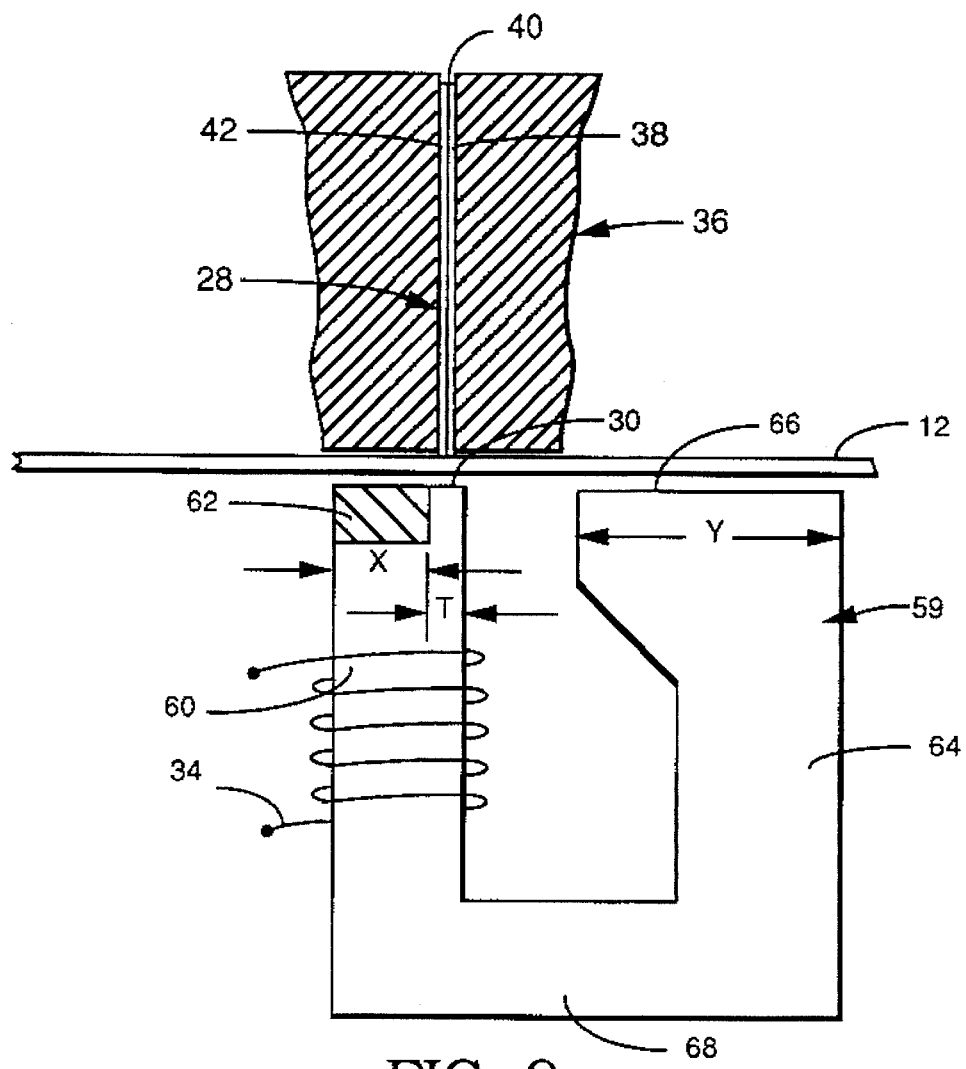
FIG. 9 is a top plan view of a preferred embodiment of a stationary pole.

In the illustrations of the previous figures, the stationary pole is shown as being of plate-like form by way of example only. As illustrated in FIG. 3, having the pole in this shape generally results in a rather lengthy return path for the lines of flux $F_2$ extending from the rear and sides of the main pole segments to the stationary pole or poles. If this return path is in air, the sensitivity of the transducer generally is reduced from that which is otherwise obtainable. In the actual implementation of the invention, therefore, it is preferable to provide a defined return path of magnetic material for the flux from the main pole segment to thereby enhance sensitivity. A top plan view of a preferred arrangement for such a stationary pole 59 is illustrated in FIG. 9 and, as seen therein, is essentially a U-shaped structure made of magnetic material such as ferrite, Alfesil, Permalloy, etc. One leg 60 of the stationary pole, which includes the elongated length or longitudinal dimension L extending into the page, includes the winding 34 wound about it. The end surface of the leg 60 forms the end face 30 which opposes the main pole segments 28 in the rotary drum and is scanned thereby. To provide a narrow magnetic face 30 while facilitating ease of manufacture and handling, the end of the leg 60 is formed with a recess along its length that is filled with a non-magnetic material 62, such as glass. By controlling the width X of this recess, the operative thickness T of the stationary pole is made as small as desirable. By way of example, thickness T is of the order of from 0.001 to 0.004 inches. The leg 60 also may be a piece of ceramic upon which the suitable magnetic material may be deposited, to provide the stationary pole of thickness T.

Another leg 64 of the U-shaped stationary pole 59 forms the return path for the flux emanating from the main poles. It has a wide end face 66 which also extends in the longitudinal dimension into the page, which face 66 faces the back of the tape 12 during operation. For example, the width Y of the end face 66 is of the order of about 20 times as great as the thickness T of the operative end face 30 of the pole. The flux which enters the end face 66 via the non-magnetic material of the drum, returns to the end face 30 of the stationary pole 59 through the leg 64 and a base 68 of the pole structure. Since this surface of end face 66 is close to the tape, the flux only has to travel through a small air gap, thereby enhancing the sensitivity of the transducer.

Figures 10A, 10B:
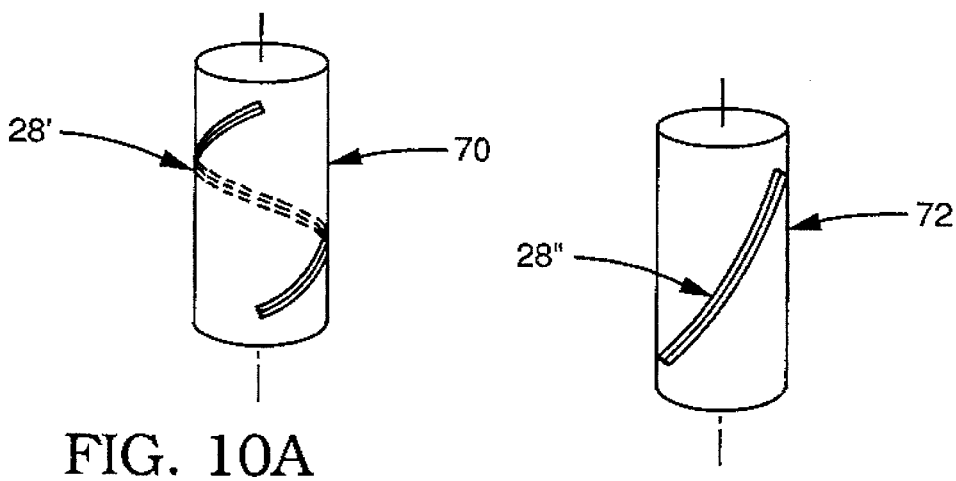
FIG. 10A and 10B are simplified perspective views of alternative embodiments of rotary drum and main pole segment combinations.

Although the prior embodiments have depicted multiple main pole segments 28 disposed about the circumference of the drums 36, 36', 36", the invention further contemplates the use of one (or more) segment 28, such as depicted in FIGS. 10A, 10B by way of example only. Thus a segment 28' may be helically disposed 360° about the circumference of a small diameter drum 70, FIG. 10A, to provide continuous data recording and readout, or may be a single segment 28" which does not extend around the entire circumference of a drum 72, FIG. 10B. The latter configuration provides segmented data flow since the ends of the segment 28" do not overlap. Thus, depending upon the application, one or more main pole segments may be used.

In addition to the elimination of moving electrical connections and the implementation of multi-track embodiments, the present invention provides other advantages. One of these is the long life, and hence greater reliability, of the magnetic transducing head that results from the relatively long front to rear dimension D of the main pole segments 28 (see in particular FIG. 4B). This dimension is analogous to the gap depth dimension of a conventional ring head, which decreases as the head wears. While it is desirable to keep this dimension small in a ring head to improve efficiency, there is no such limitation on the dimension D in the transducer of the present invention. Thus the need to replace the head on a regular basis due to wear is eliminated, since the magnetic layer 40 of the main pole segments 28 are constructed with a large depth of the order of 0.125 inch in this example to provide a great deal of wear tolerance.

Furthermore, the overall configuration of the transducing head minimizes the wear on the high permeability magnetic layer 40. First, it is protected against wear by the surrounding layers 38 and 42 of a hard material, such as ceramic. In addition, the structure of the drum 36, 36', 36" further serves to protect the layer 40 from wear. Finally, the wear is further minimized by the reduced unit pressure exerted by the tape on the layer 40 of magnetic material. In particular, the drum and the main pole segments 28 span the entire width of the tape, rather than a small portion thereof as in typical mechanically scanned transducers. Therefore, the unit pressure on the exposed end face 31 of the layer 40 is less than that encountered in other mechanically scanned transducers.

In addition to the reduced wear on the storage medium and transducing head, the tape transport is simplified by the fact that the tape travels in a relatively straight line tangential to the circumference of the rotary drum. Not only does this configuration simplify the design of the transport mechanism relative to typical mechanically scanned designs which require the tape to be wrapped around a significant portion of the drum, it also further minimizes tape wear because of the relatively minimal contact and contact pressure between the tape and the drum at any given time.

It will be appreciated by those of ordinary skill in the art that the present invention can be embodied in other specific forms without departing from the spirit or essential characteristics thereof. For example, the number and configurations of the stationary pole or poles, and the main pole segment or segments, may be varied to conform to the particular application and thus the recorder/reproducer apparatus configuration required. Further, as previously mentioned, the magnetic medium may be moved in either direction relative to the direction of movement of the main pole segments/drum. Therefore, the presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

I claim:

1. A magnetic transducer apparatus, comprising:

a first magnetic pole having a facing surface of a longitudinal dimension that is oriented in a predetermined direction;

a second magnetic pole having a facing surface that is spaced from and opposing said facing surface of the first magnetic pole, said facing surface of the second magnetic pole having a longitudinal dimension that is oriented at an angle relative to said predetermined direction;

means for moving said second magnetic pole relative to said first magnetic pole and about an axis of rotation generally parallel to said predetermined direction to move the facing surface of said second magnetic pole past the facing surface of said first magnetic pole in a direction generally transverse to said predetermined direction to cause different portions of the facing surface of said second magnetic pole to be opposed to different portions of the facing surface of said first magnetic pole for magnetically coupling said different portions as the second magnetic pole is moved relative to the first magnetic pole; and a signal winding coupled to said first magnetic pole for coupling magnetic flux between the first magnetic pole and a facing surface portion of the second magnetic pole magnetically coupled thereto.

2. The apparatus of claim 1 wherein the longitudinal dimension of said second pole is oriented at an acute angle relative to said predetermined direction.

3. The apparatus of claim 2 including:

a magnetic storage medium transported between the first and second magnetic poles in a direction transverse to the direction of movement of said second pole.

4. The apparatus of claim I wherein said moving means comprises a rotary member having said second magnetic pole mounted on a peripheral surface thereof.

5. The apparatus of claim 4 wherein said second magnetic pole is mounted within the peripheral surface with its longitudinal dimension oriented at an acute angle relative to said axis of rotation.

6. The apparatus of claim 4 wherein said rotary member contains a plurality of second magnetic poles that are mounted parallel to one another around the peripheral surface of said rotary member.

7. The apparatus of claim 6 wherein each of said second magnetic poles comprises a laminated structure including a layer of relatively high permeability magnetic material sandwiched between two non-magnetic layers.

8. The apparatus of claim 7 wherein said non-magnetic layers are made of ceramic material and the high permeability magnetic material is a Cobalt Zirconium Niobium alloy.

9. A magnetic transducing apparatus for recording and/or reproducing magnetically definable information with respect to a magnetic storage medium, comprising:

a first magnetic pole having a longitudinal dimension that is oriented in a predetermined direction;

a second magnetic pole that is spaced from said first magnetic pole, said second magnetic pole having a longitudinal dimension that is oriented at an angle relative to said predetermined direction;

means for transporting the magnetic storage medium through the space between said first and second poles in a direction generally transverse to said predetermined direction;

a signal winding coupled to said first magnetic pole for coupling magnetic flux between said first and second magnetic poles, which flux is magnetically coupled to the magnetic storage medium disposed between said poles; and means for moving said second magnetic pole past said first magnetic pole in a direction generally transverse to said predetermined direction and about an axis of rotation generally parallel to said predetermined direction to move the location at which the magnetic flux extends between said poles along said longitudinal dimension of said first pole, to move the flux which is coupled to the storage medium along a track in said medium.

10. The apparatus of claim 9 wherein said first magnetic pole is stationary and said transporting means transports the medium between confronting faces of the moving pole and stationary pole in a direction substantially perpendicular to the predetermined direction of the stationary pole.

11. The apparatus of claim 10 wherein the longitudinal dimension of said second magnetic pole is oriented at an acute angle relative to the width of said magnetic storage medium, wherein said second pole is spaced from the storage medium.

12. The apparatus of claim 9 wherein said moving means comprises a rotary member having said second magnetic pole mounted on a peripheral surface thereof.

13. The apparatus of claim 12 wherein said rotary member contains a plurality of second magnetic poles that are mounted parallel to one another around the peripheral surface of said rotary member.

14. A magnetic transducer apparatus, comprising:

a stationary elongated magnetic pole having a longitudinal dimension and an elongated face extending along said dimension;

a rotary member having a circumferential surface spaced from the elongated face of said stationary pole and an axis of rotation generally parallel to said longitudinal dimension of said stationary pole;

at least one elongated magnetic pole segment mounted on the circumferential surface of said rotary member, said pole segment having a longitudinal dimension and being disposed with its respective longitudinal dimension at an angle with respect to said axis of rotation such that, during rotation of said rotary member, a shared area formed by a common portion of said pole segment and an opposing common portion of said stationary pole is moved along said elongated face of said stationary pole in the direction of its longitudinal dimension; and a signal winding coupled to said stationary pole for coupling magnetic flux between the stationary pole and the pole segment in said shared area formed by the opposing common portions of the pole and segment, said coupled magnetic flux being moved along the longitudinal dimension of said stationary pole by rotation of the rotary member.

15. The apparatus of claim 14 wherein said rotary member contains a plurality of second magnetic poles that are mounted parallel to one another and spaced apart a distance such that the lower end of one segment intersects the stationary pole simultaneously with the upper end of an adjacent segment.

16. The apparatus of claim 14 including a plurality of elongated stationary magnetic poles each having a longitudinal dimension and being spaced apart a selected distance in said longitudinal dimension.

17. A magnetic transducing apparatus for recording and/or reproducing magnetically definable information with respect to a magnetic storage medium, comprising:

a stationary magnetic pole having a longitudinal dimension that is oriented in a predetermined direction and including an elongated end face;

at least one moveable magnetic pole that is spaced from the end face of said stationary magnetic pole and having a longitudinal dimension that is oriented at an angle relative to said predetermined direction;

transport apparatus for transporting the magnetic storage medium through the space between said stationary pole and said at least one moveable pole in a direction transverse to said predetermined direction;

a signal winding coupled to said stationary magnetic pole for coupling a concentrated magnetic flux between said stationary pole and said at least one moveable magnetic pole, said concentrated magnetic flux being magnetically coupled to the magnetic storage medium disposed between said poles; and a rotary member having an axis of rotation generally parallel to said predetermined direction for moving said at least one moveable magnetic pole past said end face of said stationary magnetic pole in a direction transverse to said predetermined direction to move the location of said concentrated magnetic flux coupled between said stationary pole and said moveable pole along said longitudinal dimension of the stationary pole, and for moving the concentrated magnetic flux which is coupled to the magnetic storage medium along a track in said medium.

18. The apparatus of claim 17 including:

a plurality of stationary magnetic poles each having a longitudinal dimension including an end face and selectively spaced apart in said predetermined direction;

said at least one moveable magnetic pole being spaced from the end faces of said stationary magnetic poles;

a plurality of signal windings respectively coupled to the plurality of stationary magnetic poles, for coupling a concentrated magnetic flux between a respective stationary pole and said at least one moveable magnetic pole, with the magnetic fluxes being magnetically coupled to the magnetic storage medium transported therebetween; and said rotary member moving the plurality of concentrated magnetic fluxes coupled to the storage medium along respective tracks in the medium associated with said plurality of stationary poles.

19. The apparatus of claim 17 wherein said rotary member contains a plurality of moveable magnetic poles that are mounted parallel to one another around the peripheral surface of said rotary member for rotation past the stationary pole in succession, said magnetic storage medium being transported in a direction opposite to the direction of movement of the moveable magnetic poles.

20. The apparatus of claim 17 wherein said at least one moveable pole comprises a laminated structure including a thin layer of relatively high permeability magnetic material sandwiched between two layers of non-magnetic material such as ceramic material.

21. A method for recording and/or reproducing magnetically definable information with respect to a magnetic storage medium, wherein a first elongate magnetic pole is oriented with a longitudinal dimension thereof in a predetermined: direction, and a second elongate magnetic pole is spaced from the first elongate magnetic pole, comprising the steps of:

orienting the longitudinal dimension of said second elongate magnetic pole at an angle relative to said predetermined direction;

moving said second elongate magnetic pole about an axis of rotation generally parallel to said predetermined direction and past said first elongate magnetic pole in a direction generally transverse to said predetermined direction to cause different successive portions of the respective longitudinal dimensions of the first and second elongate magnetic poles to be opposed to each other; and generating a magnetic transducing region which magnetically couples said different portions of said poles as the second pole moves past the first pole.

22. The method of claim 21 including:

transporting the magnetic storage medium through the space between said first and second poles in a direction generally transverse to said predetermined direction to move the magnetic transducing region coupled to the storage medium along a magnetic track in the medium.

* * * * *